L. R. POSCHADEL.
PNEUMATIC TIRE.
APPLICATION FILED APR. 16, 1915.
1,269,505.
Patented June 11, 1918.
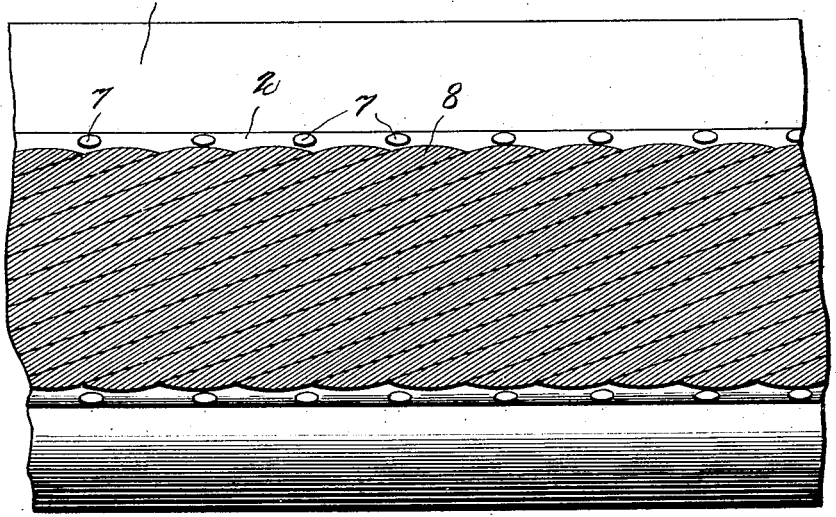
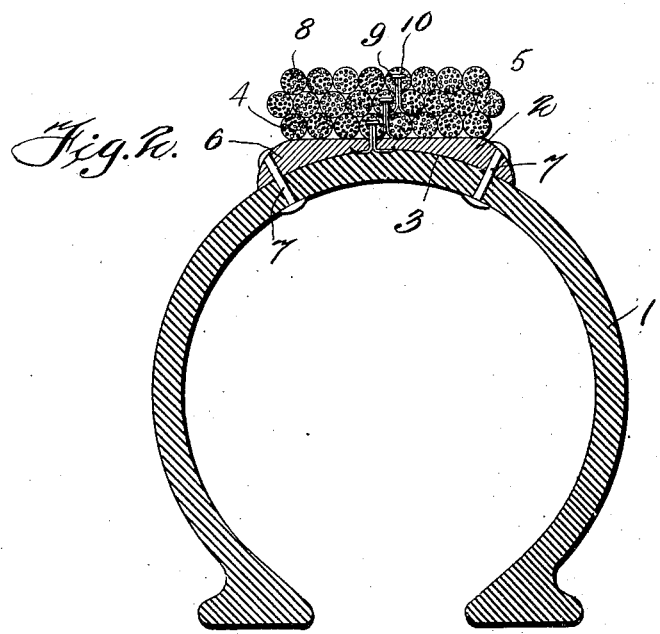
Inventor
L. R. Poschadel,
Witnesses

UNITED STATES PATENT OFFICE.

LEONARD R. POSCHADEL, OF MILWAUKEE, WISCONSIN.

PNEUMATIC TIRE.

1,269,505.　　　　Specification of Letters Patent.　　Patented June 11, 1918.

Application filed April 16, 1915. Serial No. 21,713.

*To all whom it may concern:*

Be it known that I, LEONARD R. POSCHADEL, a citizen of the United States, residing at Milwaukee, in the county of Milwaukee and State of Wisconsin, have invented certain new and useful Improvements in Pneumatic Tires; and I do hereby declare the following to be a full, clear, and exact description of the invention, such as will enable others skilled in the art to which it appertains to make and use the same.

The invention relates to improvements in pneumatic tires.

The object of the present invention is to improve the construction of pneumatic tires more especially to provide simple, practical and comparatively inexpensive means for protecting the tread portion of the outer tube or shoe and to provide a strong and durable construction adapted to receive the wear to which a tire is ordinarily subjected and capable of effectively preventing puncture of the inner tube.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing—

Figure 1 is a plan view of a portion of the outer tube or shoe of a pneumatic tire embodying the invention, Fig. 2 is a transverse sectional view of the same.

Like numerals of reference designate corresponding parts in the several views of the drawing.

In the accompanying drawing in which is illustrated the preferred embodiment of the invention, 1 designates an outer tube or shoe of the clencher type provided at its outer portion with an annular band 2 of leather or other flexible material having a concaved transversely curved inner face 3 to conform to the configuration of the outer tube or shoe and provided with a flat or transversely straight outer face 4 to receive and support a tread section 5. The flexible band which saddles the outer portion of the outer tube has thickened side portions 6 which are secured to the outer tube by rivets 7 or other suitable fastening devices piercing the thickened portion of the annular band 2 and the outer tube 1 and arranged at an angle as clearly shown in Fig. 2 of the drawing. The fastening devices 7 converge inwardly and the thickened portions 6 of the annular band 2 are preferably rounded as shown.

The tread section 5 which is substantially oblong in cross section is composed of spirally wound or coiled strands 8 which may consist of small cables or twisted wires of circular or other form. The strands 8 which may also be solid and of flat or oval form or any other desired configuration are preferably constructed of steel to render them resilient and flexible and the strands are preferably formed into three rows as illustrated in Fig. 2 of the drawing but any desired number of rows may of course be employed to adapt the tread section to the character of tire on which it is to be used. The tread section which receives all the wear to which the tire is subjected forms a protecting armor and is adapted to prevent puncture of the inner tube, not shown, and while the tread section is shown arranged exteriorly of the outer tube it may of course be contained within the material composing the outer tube and it also may be applied to a tire in the form of a shoe or tire strap. Also the layers or rows of strands may be connected with each other and with the flexible strip 3 by fastening devices 9 consisting of split rivets provided with heads 10 and passed through and arranged between the wires composing the strands 8. The sides or legs of the fastening devices 9 are spread to engage the adjacent strands and the fastening devices of the innermost strands pierce the flexible band or strip and are clenched against the inner face thereof.

In practice the strands of the tread section will be wound as short or closely as possible in order to reduce to a minimum any tendency of the tread section to unwind when the outermost strands become worn.

It will be seen that the tread section which extends circumferentially around the tire and which is of substantially the width of the tread is adapted to materially increase the life and durability of a pneumatic tire and that while it is shown applied to a tire having an outer tube of the clencher type it may be readily embodied in any character of pneumatic tire.

Also it will be seen that the tread section presents a corrugated tread surface which is adapted to prevent the tire from slipping or skidding.

What is claimed is:

1. The combination with a pneumatic tire substantially circular in cross section, of a circumferentially curved continuous annular tread section composed of spirally coiled metallic strands forming contiguous flexible cables of relatively small diameter extending circumferentially around the tire, said tread section being substantially rectangular in cross section to present continuous and cylindrical inner and outer surfaces and permanently mounted in an exteriorly projecting position so as to engage the surface of the road and receive the wear and prevent the tire from coming in contact with the same.

2. The combination with a pneumatic tire substantially circular in cross section, of a circumferentially curved continuous annular tread section composed of a plurality of concentric layers of spirally coiled metallic strands forming relatively small cables extending circumferentially around the tire, said curved section being substantially rectangular in cross section to present inner and outer surfaces and constituting a permanent portion of the tire and mounted in an exteriorly projecting position so as to engage the surface of the road and receive the wear and prevent the tire from coming in contact with the said road surface.

3. The combination with a pneumatic tire substantially circular in cross section, of a circumferentially curved continuous annular tread section composed of a plurality of concentric layers of spirally coiled metallic strands forming relatively small cables extending circumferentially around the tire, said curved section being substantially rectangular in cross section to present inner and outer surfaces, means for mounting the tread section on the pneumatic tire in a superimposed projecting position, said means consisting of a flexible band arranged circumferentially of the tire and seated on the tread of the tire exteriorly of the same and presenting a continuous outer cylindrical surface to the said tread section and an inner concave face to the tire and extending laterally beyond the curved tread section at each side of the same to provide exterior side attaching portions, concealed fastening means carried by the tread section and piercing the band between the side edges thereof and terminating short of the tire so as to not pierce the latter, and separate side fastening devices located beyond the tread section and piercing the side attaching portions of the band and the tire.

4. A pneumatic tire of the class described including an outer tube, and a tread section extending circumferentially around the outer tube and composed of spirally wound or twisted strands, said tread section being provided with fastening devices carried by certain of the strands and each having sides or legs spread to embrace two of the strands of the tread section.

In testimony whereof I affix my signature in presence of two witnesses.

LEONARD R. POSCHADEL.

Witnesses:
 ALBERT A. RHEINS,
 CAROLINE RHEINS.

Copies of this patent may be obtained for five cents each, by addressing the "Commissioner of Patents, Washington, D. C."